United States Patent
Yamane et al.

(10) Patent No.: US 6,212,132 B1
(45) Date of Patent: Apr. 3, 2001

(54) THREE-DIMENSIONAL RADAR APPARATUS AND METHOD FOR DISPLAYING THREE-DIMENSIONAL RADAR IMAGE

(75) Inventors: Daisaku Yamane, Mitaka; Yuki Sudo, Sagamihara, both of (JP)

(73) Assignee: Japan Radio Co., Ltd., Tokyo (JP)

( * ) Notice: Subject to any disclaimer, the term of this patent is extended or adjusted under 35 U.S.C. 154(b) by 0 days.

(21) Appl. No.: 09/360,258

(22) Filed: Jul. 26, 1999

(30) Foreign Application Priority Data

Aug. 4, 1998 (JP) .................................................. 10-220659

(51) Int. Cl.$^7$ ...................................................... G01S 13/89
(52) U.S. Cl. .......................... 367/180; 342/185; 342/179
(58) Field of Search .................................. 342/180, 185, 342/179, 184

(56) References Cited

U.S. PATENT DOCUMENTS

| | | | |
|---|---|---|---|
| 4,841,292 | * 6/1989 | Zeno | 342/180 |
| 5,061,935 | 10/1991 | Sekine | 342/180 |
| 5,339,085 | 8/1994 | Katoh et al. | 342/180 |
| 5,357,258 | 10/1994 | May | 342/185 |

FOREIGN PATENT DOCUMENTS 0 493 822 A1   7/1992 (EP) .

OTHER PUBLICATIONS

Patent Abstracts of Japan, vol. 1995, No. 09, Oct. 31, 1995 (1995–10–31), and JP 07–140227 A (Japan Radio Co. Ltd.), Jun. 2, 1995 (1995–06–02)—Abstract only.

Patent Abstracts of Japan, vol. 014, No. 048, (P–0997), Jan. 29, 1990 (1990–01–29) and JP 01–277786 A (Japan Radio Co. Ltd.), Nov. 8, 1989 (1989–11–08)—Abstract only.

* cited by examiner

Primary Examiner—Daniel T. Pihulic
(74) Attorney, Agent, or Firm—Frishauf, Holtz, Goodman, Langer & Chick, P.C.

(57) ABSTRACT

Disclosed is a three-dimensional radar apparatus comprising a radar transmitting/receiving unit, a three-dimensional polygon-generating unit, and a three-dimensional graphics unit, wherein a radar transmitter/receiver outputs signals concerning orientation information, distance information, and reception intensity information on the basis of a radio wave reflected from a target, and a scan converter is used to convert the signals concerning the orientation information, the distance information, and the reception intensity information into two-dimensional radar image data composed of two-dimensional rectangular coordinates and brightness information of each of picture elements. The two-dimensional radar image data is also inputted into the three-dimensional polygon-generating unit to perform polygon-generating processing on the basis of the two-dimensional rectangular coordinates and the brightness information of each of the picture elements. Three-dimensional radar image data is prepared in the three-dimensional graphics unit on the basis of obtained polygon-based information, and it is accumulated in a frame memory. Thus, a three-dimensional radar image is displayed on a display device.

10 Claims, 13 Drawing Sheets

THREE-DIMENSIONAL RADAR APPARATUS AND METHOD FOR DISPLAYING THREE-DIMENSIONAL RADAR IMAGE

BACKGROUND OF THE INVENTION

1. Field of the Invention

The present invention relates to a three-dimensional radar apparatus which is carried, for example, on a ship and which preferably detects a target. The present invention also relates to a method for displaying a three-dimensional radar image. Especially, the present invention relates to a three-dimensional radar apparatus and a method for displaying a three-dimensional radar image in which image data, which is converted into two-dimensional rectangular coordinates (X, Y) as obtained by a conventional radar apparatus, is converted into image data (X, Y, Z) added with the height direction (Z axis) on the basis of its brightness value to perform three-dimensional graphics processing, and three-dimensional image processing is performed together with two-dimensional image display operation so that display is made on a display device to be visually recognized with ease by an operator.

2. Description of the Related Art

A radar apparatus has been hitherto installed on a ship. When the ship is navigated, the ship is operated while observing the situation of the target around the navigation route by using the radar apparatus. Thus, the ship is navigated safely. As well-known in the art, such a radar apparatus is operated as follows. That is, a transmission radio wave, which is transmitted from a rotating antenna, is reflected by a target. A reflected radio wave therefrom is received to display a concentric circular image depicted about a center of its own position on a display unit.

In such a system, the intensity of the reflected radio wave is displayed as a difference in brightness of a point at which the target exists, for example, on a screen of the display unit of the raster scan type.

When such a radar apparatus is used, it is possible to observe an objective moving ship which approaches a subjective ship during its navigation and anchorage. Further, it is possible to monitor whether or not the subjective ship is deviated from an anchorage position, for example, due to a tide, on the basis of the reflected radio wave from a fixed reflecting object.

In general, when such a display unit equipped for the ship radar apparatus is operated, the target point on a screen is displayed in a two-dimensionally designed manner as in a plan view, in which the image is not displayed, for example, on the basis of the height of the target. The height and the size of the target have been judged depending on the brightness per pixel of the target displayed on the screen on the basis of the intensity of the reflected radio wave from the target.

Therefore, an inconvenience arises in that the judgement on the size of the target displayed on the radar screen differs depending on the operator of the radar apparatus. If any numerical expression based on the intensity of the reflected radio wave from the target is adopted for the height and the size of the target in order to avoid the inconvenience as described above, a large amount of data is dealt with as in the case of general image data. As a result, another inconvenience arises in that it is difficult for the radar operator to visually recognize the height and the size of the target with ease at a glance when the radar operator make judgement on the displayed numerical information.

In order to dissolve the problem as described above, the present applicant has suggested a radar apparatus which makes it possible to three-dimensionally display a target on a display unit screen so that, for example, the target is effectively detected, even by a user who is not accustomed to the radar observation so much (see Japanese Patent Publication No. 8-30732).

The three-dimensionally designed display radar disclosed in this patent document comprises a radar transmitting/receiving unit for deriving orientation information, distance information, and reception intensity information from a target respectively; a display device; a three-dimensionally designed coordinate converter for converting the orientation information and the distance information into XY coordinate values based on a perspective projection drawing method, and converting the reception intensity information into a signal for indicating a height of the target with a length of a straight line; a marker-generating means for sending a lattice-shaped or a concentric-shaped distance marker signal when three-dimensional display is made on a screen of the display device; and a storage means provided with a storage address corresponding to each of picture elements on the display device, for storing the reception intensity information in the storage address corresponding to the XY coordinates obtained by the three-dimensionally designed coordinate converter when the three-dimensionally designed display is made, and storing the marker signal so that they are successively read to send an image signal to the display device.

In the disclosed three-dimensionally designed display radar, the orientation information and the distance information obtained by the radar transmitter/receiver are converted into the XY coordinate values based on the perspective projection drawing method, and the reception intensity information is converted into the signal for indicating the height of the target with the length of the straight line so that the display is made on the display device.

Therefore, the three-dimensionally designed display radar disclosed in the patent document described above is not operated such that the target observed by using the radar apparatus is displayed in a real shape, i.e., as a real image as in the three-dimensional graphics (computer graphics).

SUMMARY OF THE INVENTION

The present invention has been made taking the foregoing problems into consideration, an object of which is to provide a three-dimensional radar apparatus and a method for displaying a three-dimensional radar image in which a target observed by the radar apparatus can be visually recognized with ease by an operator as a three-dimensional real shape.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Next, the three-dimensional radar apparatus according to the present invention will be exemplified by preferred embodiments, which will be described in detail below with reference to the accompanying drawings.

Figure 1:
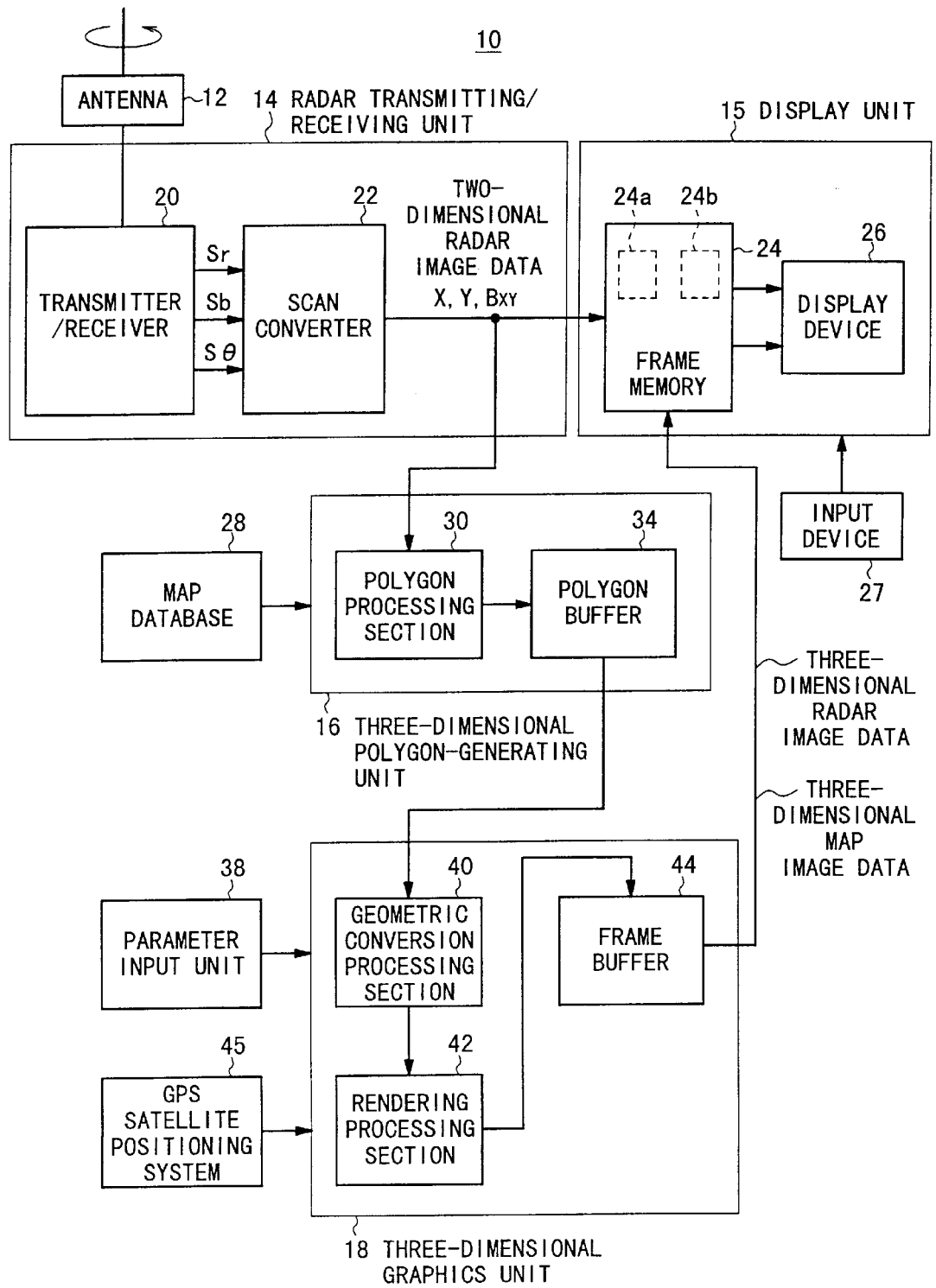
FIG. 1 shows a circuit block diagram illustrating an arrangement of an embodiment of the three-dimensional radar apparatus according to the present invention.

FIG. 1 shows an arrangement of a three-dimensional radar apparatus 10 according to an embodiment of the present invention.

The three-dimensional radar apparatus 10 basically comprises a radar transmitting/receiving unit 14 having a function substantially equivalent to the function of the conventional two-dimensional radar transmitting/receiving unit, a display unit 15 for displaying radar image data obtained by the radar transmitting/receiving unit 14, and a three-dimensional polygon-generating unit 16 and a three-dimensional graphics unit 18 for converting the two-dimensional image data obtained by the radar transmitting/receiving unit 14 into three-dimensional image data.

The radar transmitting/receiving unit 14 comprises an antenna 12 for transmitting/receiving a radio wave with respect to a target, a transmitter/receiver 20 for obtaining a distance signal Sr, an orientation signal Sθ, and an intensity signal Sb from a reflected radio wave from the target obtained by the aid of the antenna 12, and a scan converter 22 for converting the position of the target into two-dimensional rectangular coordinates (X, Y) on the basis of the distance signal Sr and the orientation signal Sθ, and converting the height of the target into brightness information Bxy corresponding to the intensity signal Sb to make conversion into respective picture element data to be displayed, i.e., two-dimensional radar image data.

The display unit 15 comprises a frame memory 24 including frame memories 24a, 24b for accumulating the image data, and a display device 26 based on the raster scan system. An input device 27 such as a keyboard, which is used, for example, to select the display output form, is connected to the display unit 15.

The three-dimensional polygon-generating unit 16 comprises a polygon processing section 30 for performing polygon-generating processing for respective picture element data (X, Y, Bxy) of the two-dimensional radar image data converted by the scan converter 22, and a polygon buffer 34 for holding polygon data processed by the polygon processing section 30.

The three-dimensional graphics unit 18 comprises a geometric conversion processing section 40 for applying, to the polygon data, geometric conversion such as coordinate conversion, a rendering processing section 42 for performing graphics processing such as hidden-surface processing, and a frame buffer 44 for holding the three-dimensional radar image data.

An ordinary computer graphics system comprising a microprocessor and a well-known image processing software can be applied to the three-dimensional polygon-generating unit 16 and the three-dimensional graphics unit 18.

A map database 28 is connected to the three-dimensional polygon-generating unit 16. A parameter input unit 38 and a positioning system (GPS positioning system) 45 based on the use of the GPS (Global positioning system) satellite are connected to the three-dimensional graphics section 18.

Next, explanation will be made for the function of the three-dimensional radar apparatus 10 constructed as described above.

The transmitter/receiver 20 is a well-known radar transmitter/receiver as disclosed in Japanese Patent Publication No. 8-30732 as the conventional technique described above, each comprising an unillustrated motor for rotating the antenna 12, an encoder coupled to a rotary shaft of the motor, a transmission trigger generator, a transmitter for transmitting a transmission signal at a predetermined frequency from the antenna 12, a receiver connected to the antenna 12 for receiving the reflected radio wave from the target, an A/D converter for digitizing the output signal of the receiver, and a distance-measuring timer connected to the transmission trigger generator.

The antenna 12 is subjected to rotary driving in the horizontal plane effected by the motor. The orientation signal Sθ, which indicates the orientation information (θ) of the antenna 12 with respect to a moving object, for example, a bow of a ship, is outputted from the encoder, and it is inputted into the scan converter 22.

A transmission trigger, which is outputted from the transmission trigger generator, is inputted into the transmitter. The transmission trigger allows the transmission pulse oscillated by an oscillator such as a magnetron to be radiated from the transmitter via the antenna 12.

The transmission pulse signal, which is radiated from the antenna 12, is reflected by the unillustrated target. The reflected radio wave from the target is received via the antenna 12 by the receiver. The intensity signal Sb, which indicates the amplitude value of the reception signal outputted from the receiver, i.e., the reception intensity information of the reflected radio wave, is converted by the A/D converter into a digital signal which is inputted into the scan converter 22.

The transmission trigger output of the transmission trigger generator is also supplied to the distance-measuring timer. The elapsed time, which is required from the point of time of the supply of the trigger signal to the reception of the reflected radio wave by the receiver, is measured by the distance-measuring timer. The half of a product of the elapsed time and the transmission velocity of the transmitted radio wave, i.e., the information on the distance to the target is converted into a digital signal which is used as a distance signal Sr to be inputted into the scan converter 22. The operation for measuring the distance effected by the distance-measuring timer is completed by the detection of the passage of time which indicates the maximum measurement distance previously set by using, for example, a switch.

The intensity signal Sb will now be explained. The directivity of the antenna 12 of the ordinary ship radar is usually set such that the beam width in the horizontal direction is about 2 degrees, and the beam width in the vertical direction is about 25 degrees in many cases. Therefore, a band-shaped beam is provided, in which the cross section is narrow in the horizontal direction and it is wide in the vertical direction.

Accordingly, when the target located at a short distance is detected, the reflected radio wave from a target having a wide horizontal width and a high height has a large intensity of the reflected radio wave because of its large reflection area, as compared with the reflected radio wave from a target having a wide horizontal width and a low height. Therefore, when the intensity of the reception signal is used as the brightness information upon the display operation, the information on the height of the target can be represented as the difference in brightness in the two-dimensional image display on the display device 26.

The orientation signal Sθ, the intensity signal Sb, and the distance signal Sr, which are obtained by the transmitter/receiver 20 as described above, are supplied to the scan converter 22. The scan converter 22 is well-known to be used for the two-dimensional radar apparatus, into which the orientation signal Sθ and the distance signal Sr are inputted. The position of the target (R, θ), which is represented by the polar coordinate system, is converted into the signal which corresponds to the two-dimensional rectangular coordinates (X, Y) on the screen of the display device 26 based on the raster scan system.

Figure 2:
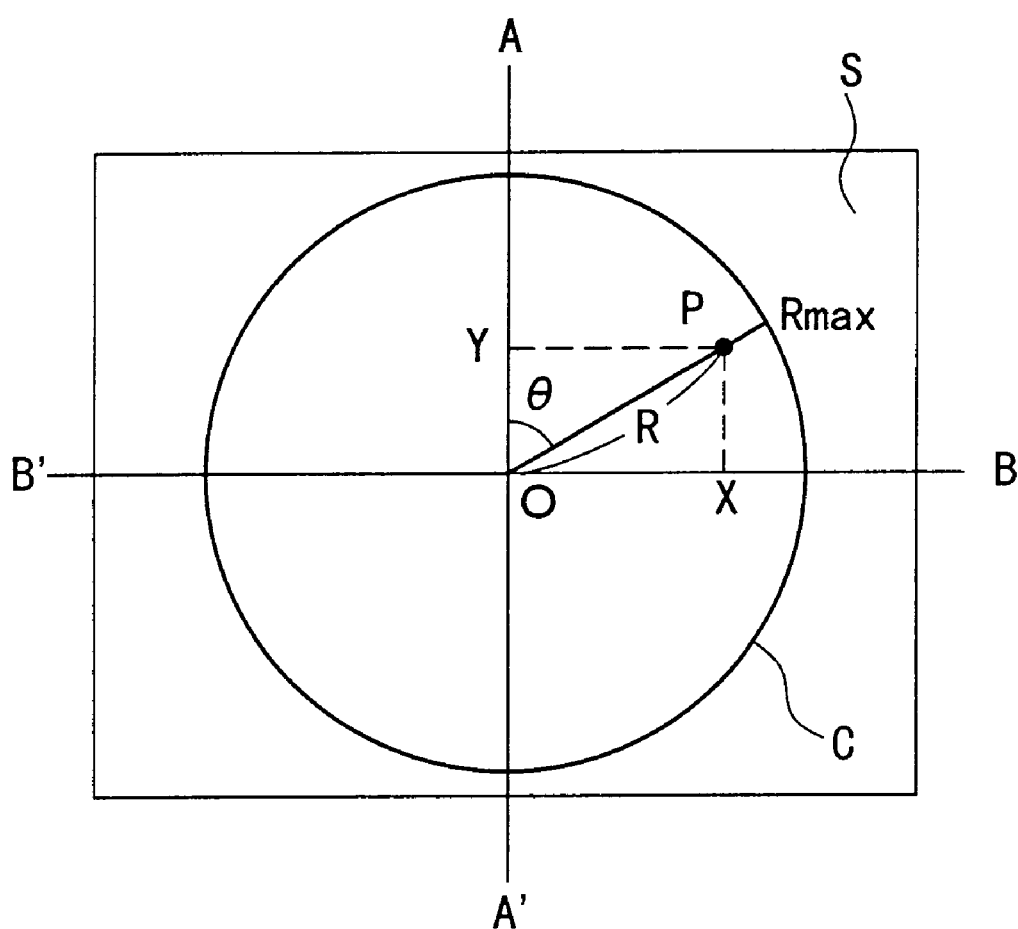
FIG. 2 schematically illustrates the operation of a scan converter.

This operation will be explained with reference to FIG. 2. The reference symbol S in FIG. 2 indicates the display screen of the scan converter 22 which adopts the raster scan system. The reference symbol C indicates a circle having a radius Rmax which represents the measurement distance range of the radar. The line segment BB' indicates the X axis which passes through the center O of the display screen S, the line segment AA' indicates the Y axis which passes through the center O of the display screen S, and the center O indicates the position of the subjective ship.

When the antenna 12 radiates the radio wave from the subjective ship position in a direction of rotation of an angle θ with respect to the bow orientation (direction A along the line segment AA'), the radio wave proceeds along the radius Rmax. The scan converter 22 calculates the X coordinate value and the Y coordinate value of each of the picture elements disposed along the line segment ORmax. For example, the values of the X coordinate and the Y coordinate of the picture element of the target (R, θ) are represented by $R\sin\theta$ and $R\cos\theta$ respectively. In this process, in order to represent the height of the concerning picture element, the corresponding brightness information Bxy is calculated on the basis of the magnitude of the intensity signal Sb concerning each of the picture elements.

The data representing the values of the X coordinate and the Y coordinate of the picture element on the display screen S and the brightness information Bxy, which are calculated by the scan converter 22 as described above, are sent as the two-dimensional image data to the display unit 15, and they are stored in the frame memory 24, for example, in the frame memory 24a. The display unit 15 reads the image data from the frame memory 24 to make display on the screen of the display device 26.

In this embodiment, the frame memory 24 of the display unit 15 has the frame memory 24a (simply referred to as "region" as well, as described later on) to be used as a storage region for the two-dimensional image display, and the frame memory 24b (simply referred to as "region" as well, as described later on) to be used as a region for the three-dimensional image display obtained by the method described later on. The display unit 15 can be operated as follows on the basis of, for example, the designation of the display form effected by the input device 27. That is, it is possible to read selected one or both of the image stored in the frame memory 24a and the image stored in the frame memory 24b. One of the images can be selectively drawn on the full screen on the display device 26. Alternatively, the both of the images can be simultaneously depicted (drawn in an arranged manner) while dividing the screen on the display device 26.

On the other hand, the two-dimensional radar image data, which is calculated by the scan converter 22, is inputted into the three-dimensional polygon-generating unit 16 to perform the polygon-generating processing in the three-dimensional polygon-generating unit 16. The three-dimensional radar image data is prepared in the three-dimensional graphics unit 18 on the basis of the image data after the polygon processing.

Figure 3:
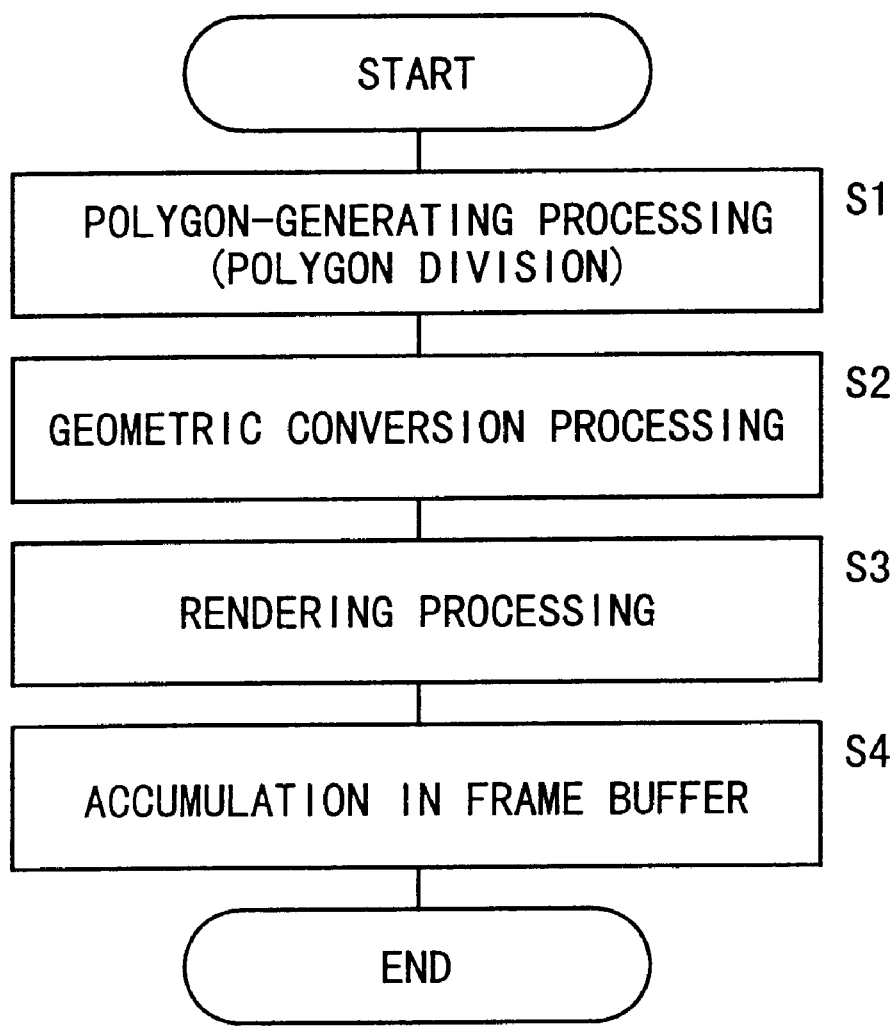
FIG. 3 shows a flow chart illustrating a general processing procedure for preparing three-dimensional image data.

Explanation will now be made on the basis of a flow chart shown in FIG. 3 for the general polygon-generating processing procedure and the three-dimensional graphic processing procedure to display the three-dimensional image.

A large amount of calculation processing is required to prepare one sheet of image while performing the projection conversion for each of the picture elements in the image space. Therefore, in ordinary cases, the data to be displayed is dealt with as the geometric model or the polygon data so that the data is held by the three-dimensional polygon-generating unit 16 to perform the processing (step S1). In the case of the geometric model, it is advantageous that the data is once decomposed into minute polygons to be held, in view of the processing speed. Usually, the polygons are triangular or quadrangular primitives, and the data is held as a set thereof.

Figure 4:
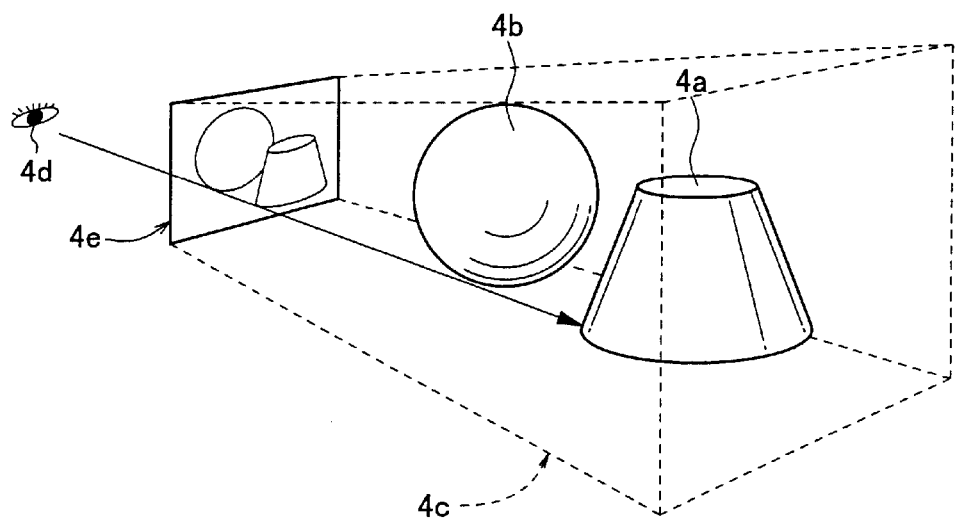
FIG. 4 schematically illustrates a method for displaying a three-dimensional image of an object.

In order to display the three-dimensional image, the following basic technique is adopted as shown in FIG. 4. That is, the objects 4a, 4b are projected onto a two-dimensional surface (referred to as "image space") 4e near to a point of sight 4d set at an arbitrary position, from the space (referred to as "object space") 4c in which the actual objects 4a, 4b are arranged to obtain a two-dimensional image which is drawn on the display surface.

The step for performing the projection processing is the geometric conversion processing (step S2). In general, in the geometric conversion processing (step S2), it is necessary to newly perform the projection calculation every time when the parameter such as the position of the point of sight is changed. The calculation processing time differs depending on the number of objects and the number of polygons for approximating the object. The movement of the position of the point is sight is equivalent to the movement of the object. Therefore, in the actual processing, the calculation processing for the coordinate conversion based on the matrix represented by Expression (1) is performed, including, for example, rotation, movement, and magnification of the object (or polygon) coordinate.

$$[x, y, z, 1] \begin{bmatrix} a & b & c & d \\ e & f & g & h \\ i & j & k & l \\ m & o & p & q \end{bmatrix} = [X, Y, Z, 1] \quad (1)$$

In Expression (1), [x, y, z] represents the coordinates to be converted, "a" to "q" represent the elements of the conversion matrix, and [X, Y, Z] represents the coordinates after the conversion.

A large amount of calculation processing is required to prepare one sheet of image while performing the projection conversion for each of the picture elements in the image space 4e as described above. Therefore, in general, the amount of calculation processing is decreased by performing the projection conversion for only the apex coordinates of the polygons.

Figure 5:
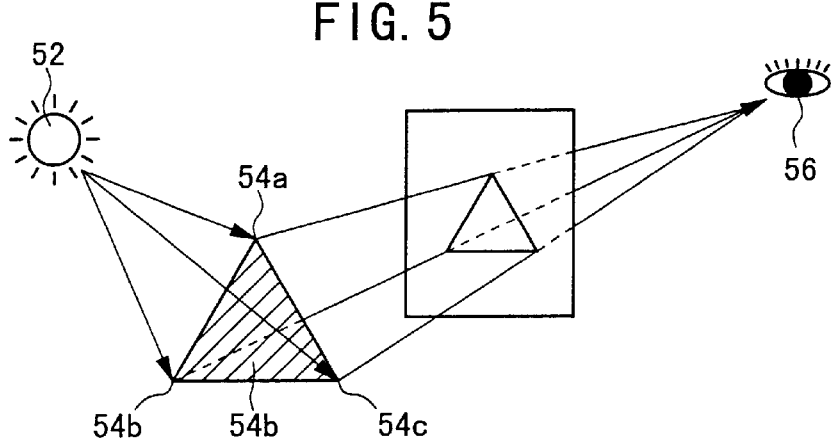
FIG. 5 schematically illustrates the shading processing performed in the geometric conversion processing.
Figure 6:
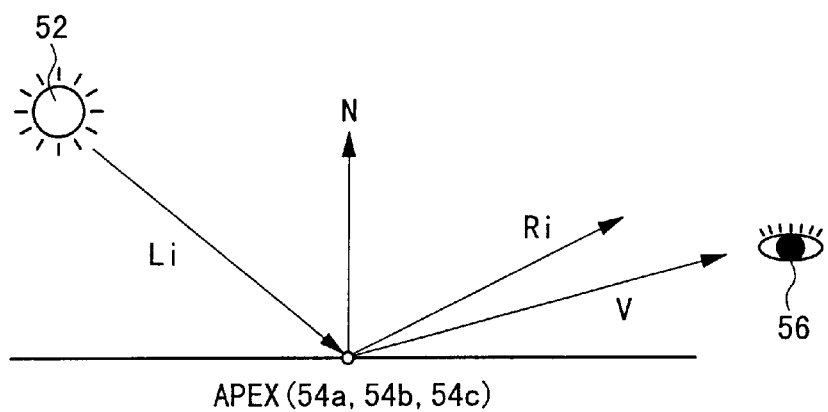
FIG. 6 schematically illustrates the shading processing performed in the geometric conversion processing.

In the geometric conversion processing (step S2), as the next processing step as shown in FIGS. 5 and 6, the coordinates and the brightness values (or color values) of the respective apexes 54a to 54c of the triangular polygon 54 after the projection conversion are utilized to calculate the brightness values of the respective apexes 54a to 54c at the position 56 of the point of sight in accordance with the inclination with respect to the given light source 52.

The known calculation method includes a variety of methods including those ranging from simple one referred to as "flat shading" to complicated one referred to as "Phong shading". According to the calculation method called "Phong shading", the brightness lo at each of the apexes 54a to 54c shown in FIG. 5 is represented by lo=la+likd(N•Li)+liks(V•Ri). In this expression, la represents the environmental light, likd(N•Li) represents the diffusion reflection light, and liks(V•Ri) represents the mirror surface reflection light. Further, N represents the normal line, Li represents the ray of light, Ri represents the reflected ray of light, (A•B) represents the inner product, and V represents the line of sight.

Figure 7:
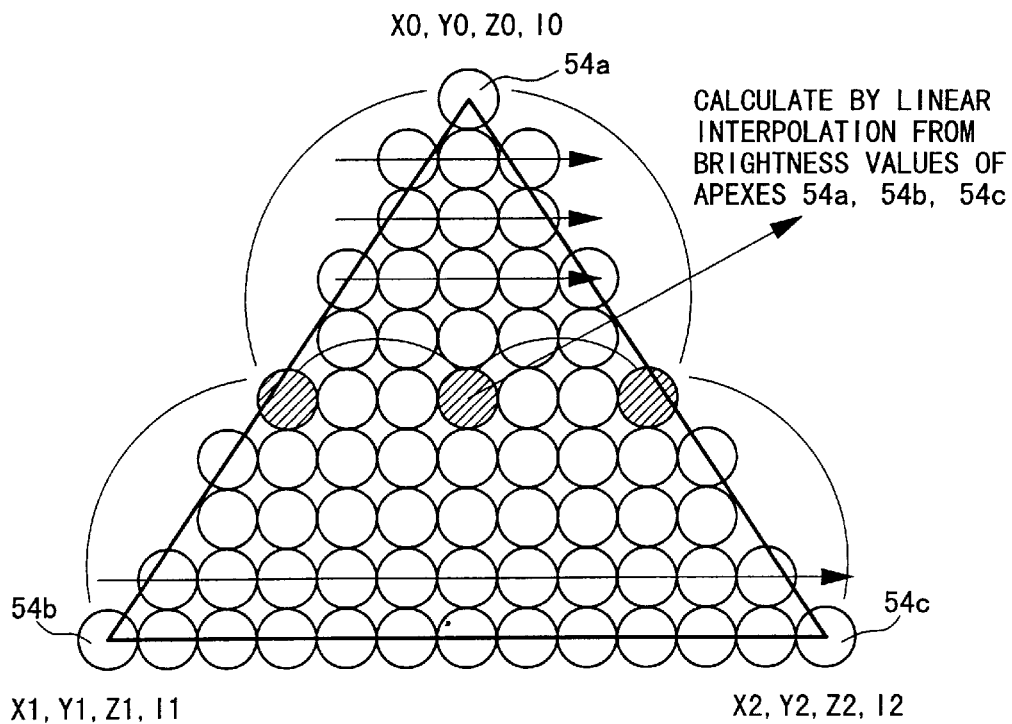
FIG. 7 illustrates the polygon-filling processing in the rendering processing.

Based on the apex coordinate and the brightness value obtained as described above, the rendering processing is performed as described below as the processing step S3. That is, as shown in FIG. 7, the respective pixels (picture elements) in the polygon are smeared while performing the interpolation calculation in accordance with the distance between the concerning pixel and the respective apexes, on the basis of the coordinates (X0, Y0, Z0), (X1, Y1, Z1), (X2, Y2, Z2) and the brightness values I0, I1, I2 of the respective apexes 54a to 54c obtained in the geometric conversion processing (step S2). The image data of the image of each picture element is prepared. The obtained data is accumulated in the frame buffer 44 in the step S4.

In this process, the image data of each picture element has the depth information. Therefore, a buffer, which is generally called "Z buffer", is provided for accumulating the depth information. The processing is performed while making comparison with the depth information of the previously written image data. In the case of being near to the point of sight, the data is written into the frame buffer 44, and the depth information is written into the Z buffer as well. In other cases, no data is written. Of course, the farthest distance from the expressible point of sight is written for the initial value of the Z buffer.

The image data, which is accumulated in the frame buffer 44 as described above, is successively read in a scanning manner, and it is displayed as the three-dimensional image on the display device such as CRT. The known drawing system also includes the drawing method called "ray tracing" in which a certain picture element is used as the center, and the drawing is performed while successively making projection for the picture element one by one, other than the system based on the use of the Z buffer described above.

The foregoing description relates to the general polygon-generating processing technique and the three-dimensional graphic processing technique to be used when the three-dimensional image is displayed.

As described above, the three-dimensional image model to be displayed can be constructed on condition that the polygon division is effected and the brightness value thereof is obtained. Therefore, the present invention is constructed such that the polygon generation is carried out by using the polygon-generating unit 16 on the basis of the two-dimensional image data (the coordinates X, Y and the brightness information Bxy of the respective picture elements) obtained by the radar transmitting/receiving unit 14.

Figure 8:
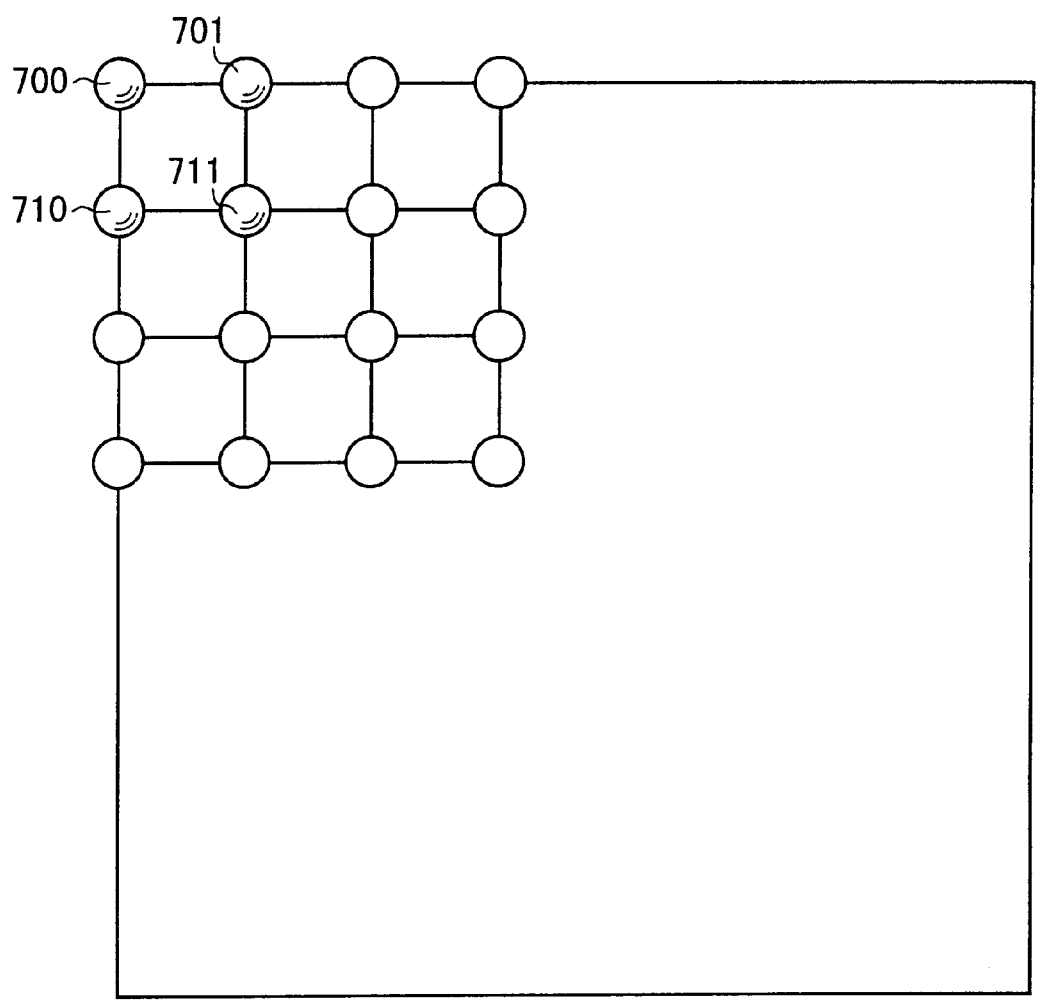
FIG. 8 illustrates a lattice-shaped arrangement of a two-dimensional radar image.
Figure 9:
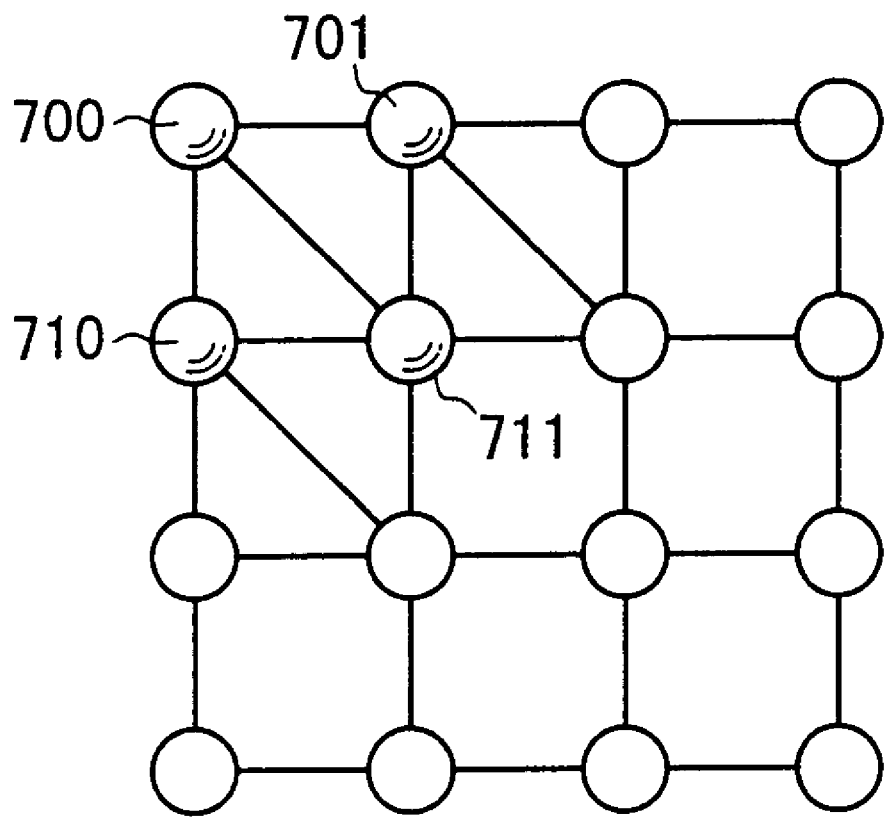
FIG. 9 shows a plan illustration for explaining the polygon data prepared from the two-dimensional radar image data.
Figure 10:
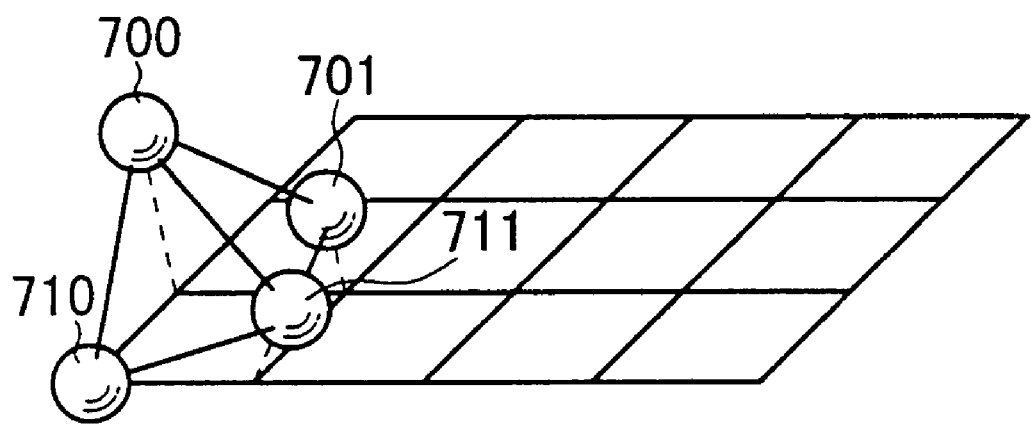
FIG. 10 shows a perspective illustration for explaining the polygon data prepared from the two-dimensional radar image data.

That is, the two-dimensional radar image data (the coordinates X, Y and the brightness information Bxy of the respective picture elements), which is obtained by the radar transmitting/receiving unit 14, is the data of each of the picture elements 7ij arranged on the two-dimensional lattice with certain brightness values Bxy respectively as shown in FIG. 8. In the present invention, the region, which is surrounded by three picture elements (for example, picture elements 700, 701, 711 or picture elements 700, 710, 711) of the picture elements 7ij, is defined as the polygon. On this assumption, when the brightness value Bxy on each lattice (picture element) is regarded as the height, a polygon-based three-dimensional image model is completed as shown in FIGS. 9 and 10. FIG. 9 depicts a state in which the polygons are viewed from a position disposed just thereover. FIG. 10 depicts a state in which the polygons are viewed from a position disposed slightly obliquely.

In the embodiment of the present invention, the picture elements, which are arranged in the quadrangular configuration on the two-dimensional lattice, are simply subjected to the polygon division processing into the triangles. It is a matter of course that the polygon generation may be performed by using the quadrangles as they are. In this case, the rendering processing section 42 of the three-dimensional graphics unit 18 disposed at the downstream stage may be allowed to have a function to process the quadrangular polygons (for example, a processing function to fill the polygon). The rendering system, which is dominantly adopted for the graphics IC and the graphics board at present, is designed to process the triangular polygon. It is a matter of course that the time required to process the image data corresponding to one screen is long when the number of polygons is large. Therefore, it is also possible to curtail the picture elements to perform the processing with larger polygons.

The polygon (image) data, which is processed in the three-dimensional polygon-generating unit 16 as described above, is sent to the three-dimensional graphics unit 18 via the polygon buffer 34. The data is processed in the geometric conversion processing section 40 and the rendering processing section 42 in the same manner as in the general three-dimensional image data processing described above. The three-dimensional radar image data is accumulated in the frame buffer 44.

The parameters inputted from the parameter input unit 38 are parameters necessary to perform the three-dimensional computer graphics processing, including, for example, the position of the point of sight, the direction of the line of sight, the position of the light source (the number of light sources is also required when the plurality of light sources are used), the brightness value, and the position of the projection surface. When the numerical values of them are inputted, the calculation is performed in the geometric conversion and the rendering processing. The image can be easily manipulated to rotate, magnify, and reduce the image by using a pointing device such as a mouse, a track ball, and a joystick.

Further, the geographical features, which are accumulated in the map database 28 of the three-dimensional polygon-generating unit 16, can be subjected to the polygon processing in accordance with the same method as that used for the two-dimensional image information obtained from the radar transmitting/receiving unit 14 to make overlay with the image obtained by using the radar transmitting/receiving unit 14.

That is, the geographical features, which are depicted, for example, in a commercially available map or a map issued by Geographical Survey Institute, are divided into lattice-shaped meshes, and the height of the concerning geographical feature (height information) is added to each of the lattice points. In this way, the polygons can be generated in exactly the same manner as that used in the polygon-generating processing for the two-dimensional image information obtained from the radar transmitting/receiving unit 14 described above, making it possible to display the three-dimensional image by the aid of the three-dimensional graphics unit 18.

Figure 11:
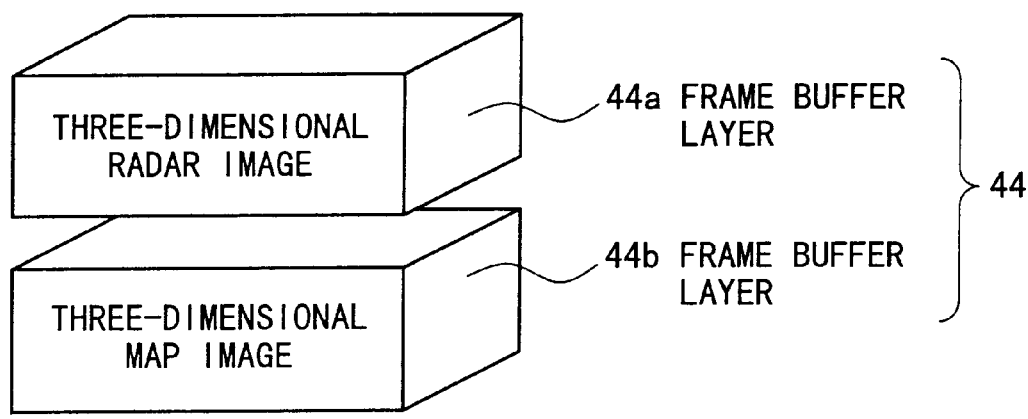
FIG. 11 schematically illustrates an arrangement of a frame buffer for superimposing a three-dimensional radar image and a three-dimensional map image.

In this embodiment, as shown in FIG. 11, the frame buffer 44 is provided with a frame buffer layer 44a and a frame buffer layer 44b as first and second frame buffer layers. The three-dimensional radar image data and the three-dimensional map image data processed in the geometric conversion processing section 40 and the rendering processing section 42 may be accumulated in the respective frame buffer layers 44a, 44b.

That is, the three-dimensional radar image data is accumulated in the frame buffer layer 44a, and the three-dimensional map image data is accumulated in the frame buffer layer 44b. The positional alignment for the two images can be performed by adjusting the latitude and the longitude on the map to the latitude and the longitude obtained by the GPS satellite positioning system 45. Therefore, the positional alignment can be performed with ease by utilizing the GPS satellite positioning system 45.

When the three-dimensional radar image data and the three-dimensional map image data are video-read from the frame buffer 44 (from the layer 44a and the layer 44b), i.e., when so-called video scan (video scanning) is performed, then the three-dimensional radar image is overwritten on the three-dimensional map image to make display in a combined manner, or the three-dimensional radar image is traced in a semitransparent form over the three-dimensional map image to make display in a combined manner. Such a procedure can be realized by using a look-up table of an unillustrated video section of the display unit 15. The simple superimposed display, in which the three-dimensional radar image data and the three-dimensional map image data are subjected to the calculation to obtain the arithmetic mean, can be performed either by using a fixed look-up table system or by setting a table from the outside.

The three-dimensional radar image data and the three-dimensional map image data (also referred to as "three-dimensional radar/map image data"), which are prepared by the aid of the three-dimensional polygon-generating unit 16 and the three-dimensional graphics unit 18 as described above, are sent to the display unit 15, and they are accumulated in the frame memory 24 together with the two-dimensional radar image data prepared by the scan converter 22 of the radar transmitting/receiving unit 14. The two-dimensional radar image and/or the three-dimensional radar image and the three-dimensional map image (three-dimensional radar/map image) are displayed on the display device 26 on the basis of the instruction given from the input device 27.

Figure 12:
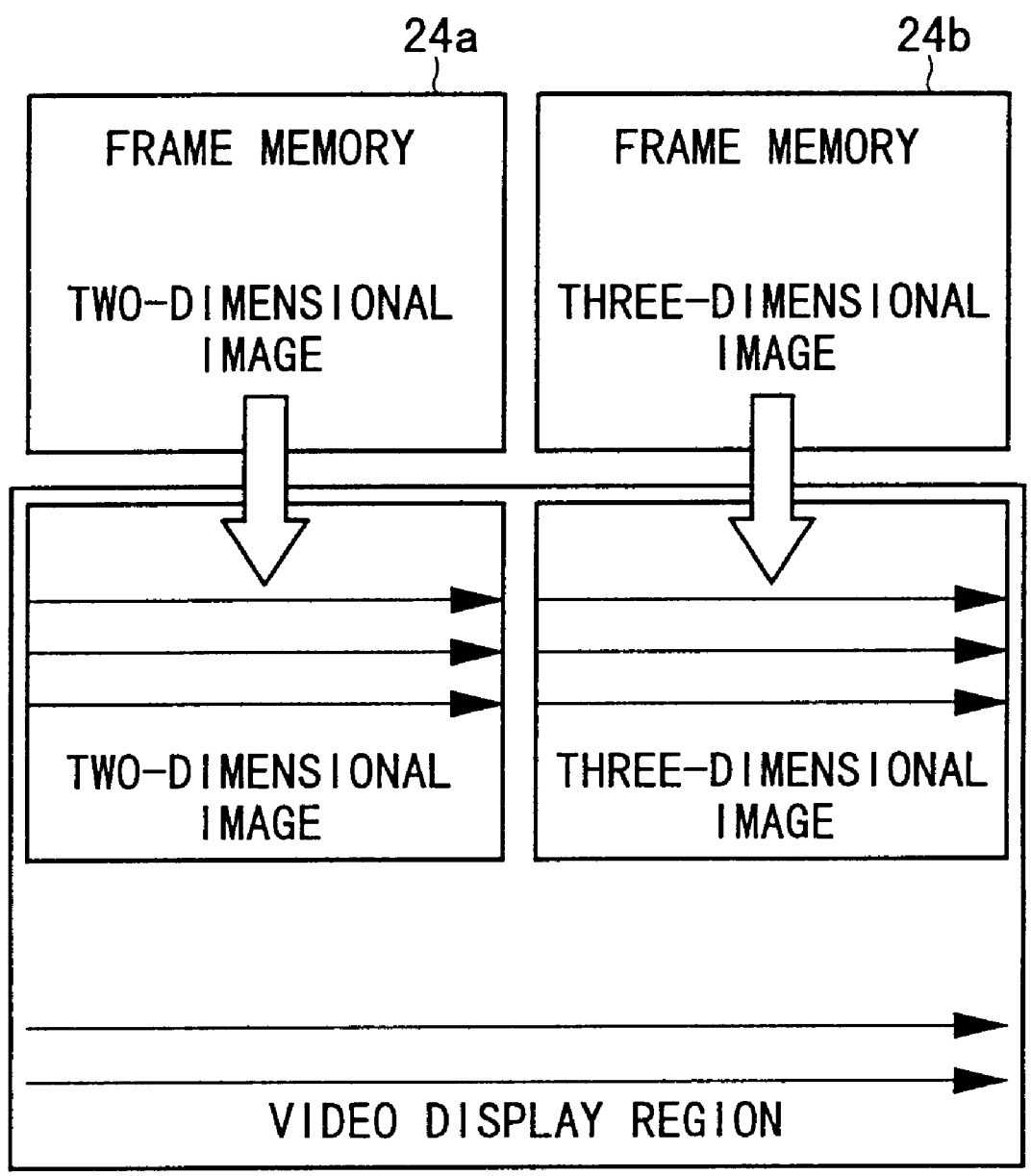
FIG. 12 conceptually illustrates the processing for combining a two-dimensional radar image, a three-dimensional radar image, and a three-dimensional map image to simultaneously display them.

The two-dimensional radar image, the three-dimensional radar image, and the three-dimensional map image may be accumulated on the frame memory 24 in accordance with the following arrangement. That is, the respective drawing (or writing) regions of the frame memory 24 shown in FIG. 1 are designed in a fixedly divided manner into the region 24a and the region 24b. The two-dimensional radar image data is accumulated in the region 24a, and the three-dimensional radar image data and the three-dimensional map image data are accumulated in the region 24b. Alternatively, as shown in FIG. 12, two frame memories 24a, 24b are provided. When the data is read to the display device 26 (when the video scan is performed), the respective addresses (regions) to be subjected to the display are previously set. For example, when the scan address is located in the two-dimensional radar image display region, the image data is read from the frame memory 24a for the two-dimensional image. When the scan address enters the three-dimensional image display region, the three-dimensional radar/map image data is read from the frame memory 24b for the three-dimensional image. In this embodiment, the display region may be set in a fixed manner. Alternatively, the display region may be variably set from the outside. Any one of the foregoing arrangements may be available.

The polygon buffer 34 and the frame buffer 44, which are included in the three-dimensional polygon-generating unit 16 and the three-dimensional graphics unit 18 respectively, may be constructed as a memory common to the frame memory 24 of the display unit 15.

Figure 13:
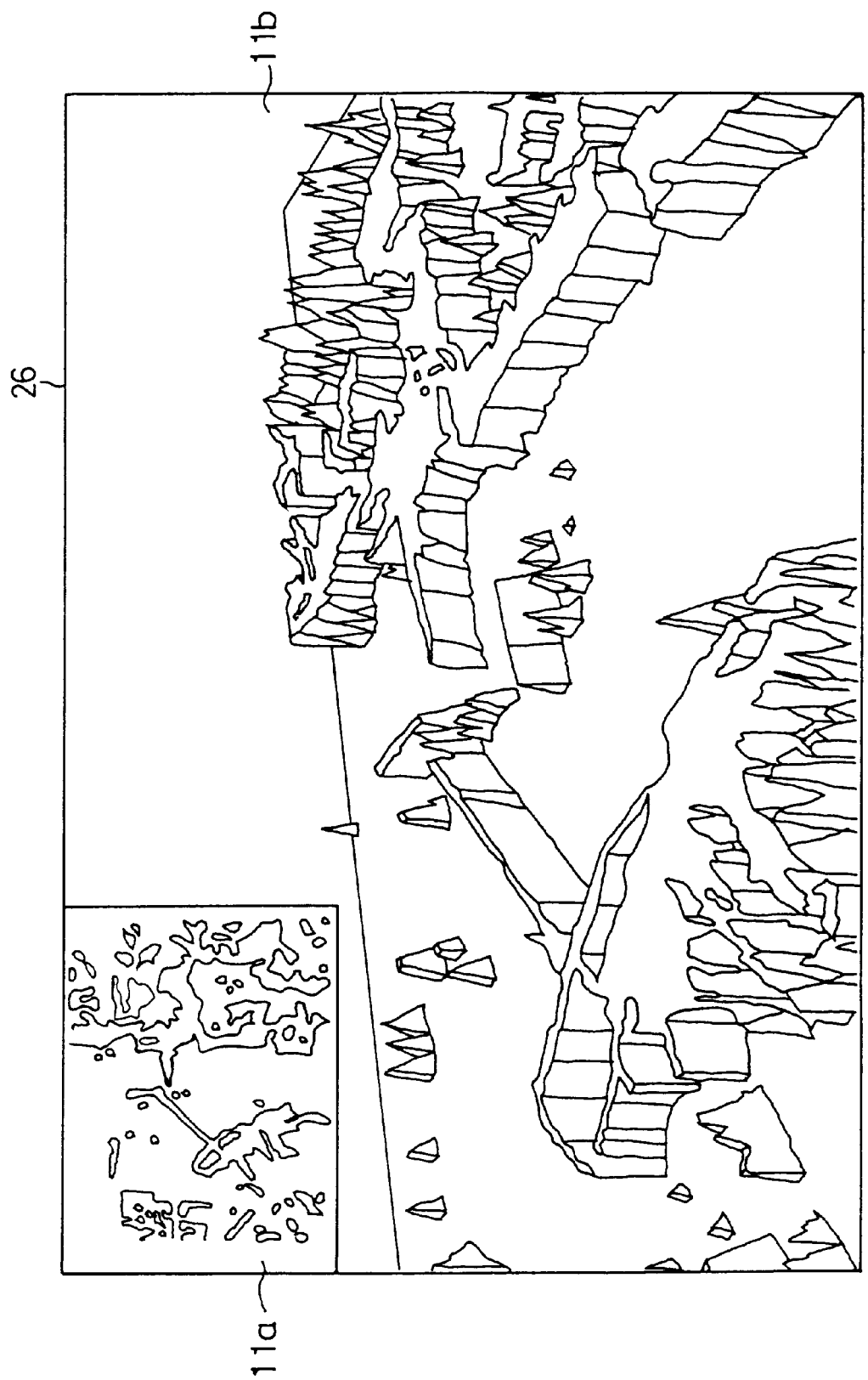
FIG. 13 illustrates a display example in which a two-dimensional radar image, a three-dimensional radar image, and a three-dimensional map image are simultaneously displayed.

FIG. 13 shows an example in which the two-dimensional radar image, the three-dimensional radar image, and the three-dimensional map image are displayed in a combined manner on the display device 26 as described above. In FIG. 13, the image 11a indicates the two-dimensional radar image observed by the radar transmitting/receiving unit 14. The image 11b indicates the image in which the three-dimensional radar image and the three-dimensional map image processed by the aid of the three-dimensional polygon-generating unit 16 and the three-dimensional graphics unit 18 are displayed in a superimposed manner.

When such a three-dimensional radar image is displayed, an expert, who is accustomed to see the conventional two-dimensional radar image, may be puzzled if only the real three-dimensional image 11b involving dynamic and momentary change is displayed.

Accordingly, as shown in FIG. 13, the conventional two-dimensional radar image 11a is simultaneously depicted together with the three-dimensional radar image 11b on the display device 26. In this arrangement, when the both images are observed, the three-dimensional radar image having higher performance of visual recognition is effectively utilized.

It is a matter of course that only the three-dimensional radar image 11b can be displayed, or the two-dimensional radar image 11a can be displayed on the full screen to make confirmation.

According to the present invention, it is possible to provide the three-dimensional radar apparatus in which the image data converted into the two-dimensional rectangular coordinates (X, Y) obtained by the conventional radar apparatus is converted into the image data (X, Y, Z) added with the height direction (Z axis) on the basis of the brightness value thereof to perform the three-dimensional graphics processing so that the graphics-processed three-dimensional image may be displayed in addition to the two-dimensional image display based on the use of the conventional radar apparatus. Thus, an effect is achieved in that the target observed by the radar apparatus can be visually recognized by the operator with ease in the three-dimensional realistic form.

Further, according to the present invention, the three-dimensional radar image and the three-dimensional map image can be combined and displayed. Thus, an effect is achieved in that the radar image can be displayed by using the more realistic three-dimensional image.

What is claimed is:

1. A three-dimensional radar apparatus comprising:
   a radar transmitting/receiving unit including a radar transmitter/receiver connected to an antenna, for deriving signals concerning orientation information, distance information, and reception intensity information relative to a target respectively, and a scan converter for outputting two-dimensional radar image data composed of two-dimensional rectangular coordinates and brightness information of each of picture elements from said signals concerning said orientation information, said distance information, and said reception intensity information;
   a display unit including a frame memory for accumulating image data, and a display device for displaying said image data accumulated in said frame memory;
   a three-dimensional polygon-generating unit for performing polygon-generating processing on the basis of said two-dimensional rectangular coordinates and said brightness information of each of said picture elements included in said two-dimensional radar image data; and
   a three-dimensional graphics unit for preparing three-dimensional radar image data on the basis of obtained polygon-based information, wherein:
      said three-dimensional radar image data is accumulated in said frame memory, and a three-dimensional radar image is displayed on said display device.

2. The three-dimensional radar apparatus according to claim 1, further comprising:
   a map database accumulated with position information and height information at each of lattice points of a geographical feature divided on a two-dimensional lattice; and
   a frame buffer composed of first and second frame buffer layers included in said three-dimensional graphics unit, wherein:
      said polygon-generating processing is performed in said three-dimensional polygon-generating unit on the basis of said position information and said height information obtained from said map database;
      three-dimensional map image data is prepared in said three-dimensional graphics unit on the basis of obtained polygon-based information to accumulate it in said second frame buffer layer, and said three-dimensional radar image prepared by said three-dimensional graphics unit is accumulated in said first frame buffer layer;
      when said three-dimensional radar image is accumulated in said frame memory, said three-dimensional radar image data and said three-dimensional map image data, which have been accumulated in said first and second frame buffer layers, are read and combined with each other to accumulate them as three-dimensional radar/map image data; and
      a three-dimensional radar/map image is displayed on said display device.

3. The three-dimensional radar apparatus according to claim 2, wherein positional alignment for said three-dimensional radar image and said three-dimensional map image is performed by utilizing a GPS satellite positioning system.

4. A three-dimensional radar apparatus comprising:
   a radar transmitting/receiving unit including a radar transmitter/receiver connected to an antenna, for deriving signals concerning orientation information, distance information, and reception intensity information relative to a target respectively, and a scan converter for outputting two-dimensional radar image data composed of two-dimensional rectangular coordinates and brightness information of each of picture elements from said signals concerning said orientation information, said distance information, and said reception intensity information;
   a display unit including a frame memory for accumulating image data, and a display device for displaying said image data accumulated in said frame memory;
   a three-dimensional polygon-generating unit for performing polygon-generating processing on the basis of said two-dimensional rectangular coordinates and said brightness information of each of said picture elements included in said two-dimensional radar image data; and
   a three-dimensional graphics unit for preparing three-dimensional radar image data on the basis of obtained polygon-based information, wherein:
      said two-dimensional radar image data and said three-dimensional radar image data are accumulated in said frame memory; and
      when display is made on said display device, then only said two-dimensional radar image is displayed, only said three-dimensional radar image is displayed, or said two-dimensional radar image and said three-dimensional radar image are simultaneously displayed.

5. The three-dimensional radar apparatus according to claim 4, further comprising, for simultaneously displaying said two-dimensional image and said three-dimensional image:
   a map database accumulated with position information and height information at each of lattice points of a geographical feature divided on a two-dimensional lattice; and
   a frame buffer composed of first and second frame buffer layers included in said three-dimensional graphics unit, wherein:
      said polygon-generating processing is performed in said three-dimensional polygon-generating unit on the basis of said position information and said height information obtained from said map database;
      three-dimensional map image data is prepared in said three-dimensional graphics unit on the basis of obtained polygon-based information to accumulate it in said second frame buffer layer, and said three-dimensional radar image prepared by said three-dimensional graphics unit is accumulated in said first frame buffer layer;

when said three-dimensional radar image is accumulated in said frame memory, said three-dimensional radar image data and said three-dimensional map image data, which have been accumulated in said first and second frame buffer layers, are read and combined with each other to accumulate them as three-dimensional radar/map image data; and a three-dimensional radar/map image and a two-dimensional radar image are simultaneously displayed on said display device.

6. The three-dimensional radar apparatus according to claim 5, wherein positional alignment for said three-dimensional radar image and said three-dimensional map image is performed by utilizing a GPS satellite positioning system (45).

7. A method for displaying a three-dimensional radar image comprising:

a first step of outputting, from a radar transmitting/receiving unit, two-dimensional radar image data composed of two-dimensional rectangular coordinates and brightness information of each of picture elements concerning a target;

a second step of performing polygon-generating processing in a three-dimensional polygon-generating unit on the basis of said two-dimensional rectangular coordinates and said brightness information of each of said picture elements included in said two-dimensional radar image data;

a third step of preparing three-dimensional radar image data in a three-dimensional graphics unit on the basis of obtained polygon-based information; and fourth step of displaying, on a display device, a three-dimensional radar image based on said three-dimensional radar image data.

8. The method for displaying said three-dimensional radar image according to claim 7, wherein in said fourth step, a two-dimensional radar image based on said two-dimensional radar image data is displayed on said display device together with said three-dimensional radar image.

9. The method for displaying said three-dimensional radar image according to claim 7, wherein:

in said second step, said polygon-generating processing is further performed on the basis of position information and height information at each of lattice points of a geographical feature divided on a two-dimensional lattice obtained from a map database;

in said third step, three-dimensional map image data is further prepared on the basis of obtained polygon-based information; and in said fourth step, said three-dimensional radar image based on said three-dimensional radar image data and a three-dimensional map image based on said three-dimensional map image data are combined and displayed on said display device.

10. The method for displaying said three-dimensional radar image according to claim 8, wherein:

in said second step, said polygon-generating processing is further performed on the basis of position information and height information at each of lattice points of a geographical feature divided on a two-dimensional lattice obtained from a map database;

in said third step, three-dimensional map image data is further prepared on the basis of obtained polygon-based information; and in said fourth step, said three-dimensional radar image based on said three-dimensional radar image data and a three-dimensional map image based on said three-dimensional map image data are combined and displayed on said display device, and said two-dimensional radar image based on said two-dimensional radar image data is displayed on said display device.

* * * * *

UNITED STATES PATENT AND TRADEMARK OFFICE
CERTIFICATE OF CORRECTION

PATENT NO.    : 6,212,132 B1
DATED         : April 3, 2001
INVENTOR(S)   : Daisaku Yamane et al.

It is certified that error appears in the above-identified patent and that said Letters Patent is hereby corrected as shown below:

<u>Title page,</u>
Item [56], References Cited, FOREIGN PATENT DOCUMENTS, insert
-- 8-30732       3/1996            Japan --.

Signed and Sealed this

Twenty-sixth Day of November, 2002

Attest:

Attesting Officer

JAMES E. ROGAN
Director of the United States Patent and Trademark Office